United States Patent Office 2,897,987
Patented Aug. 4, 1959

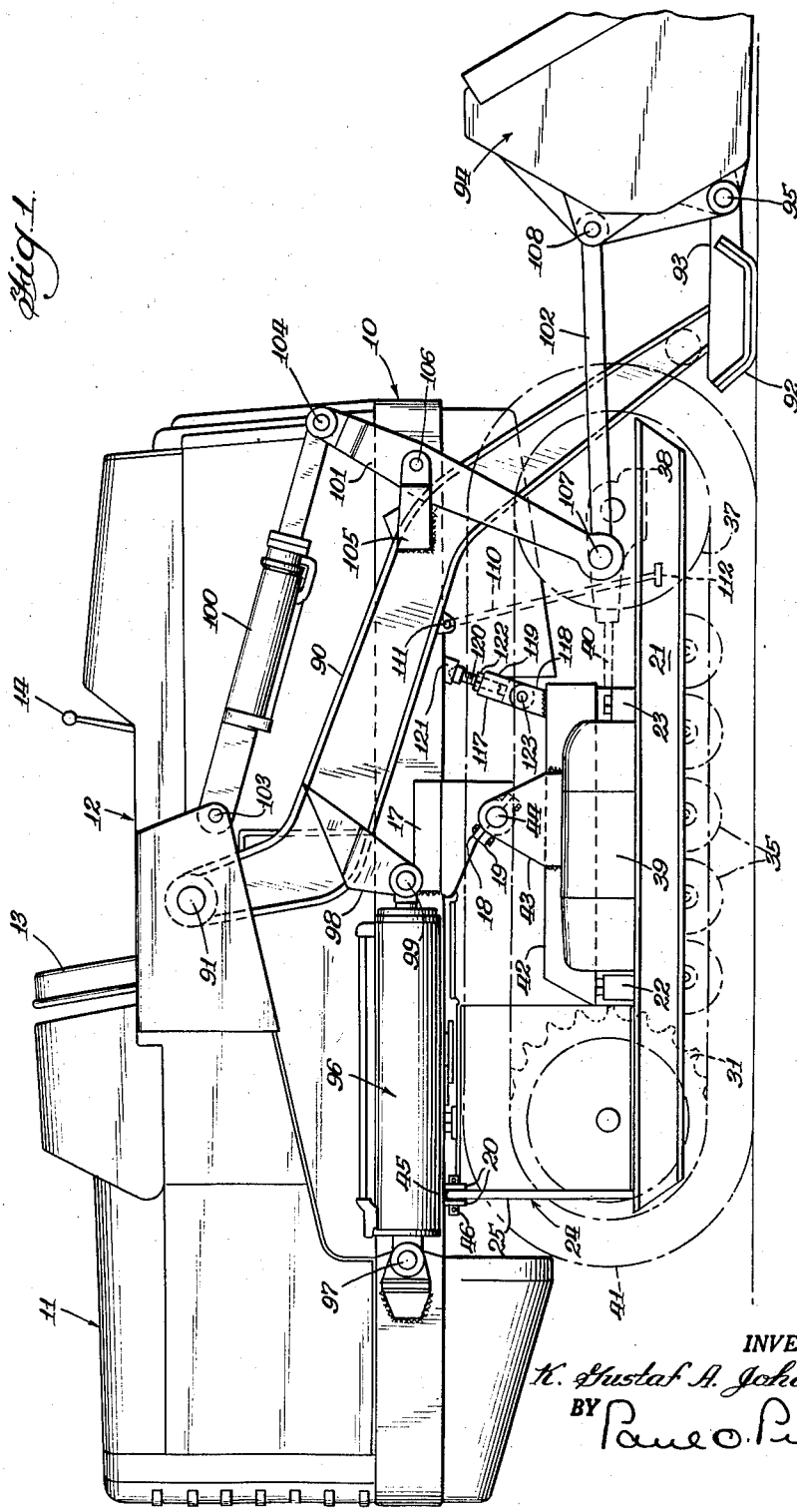

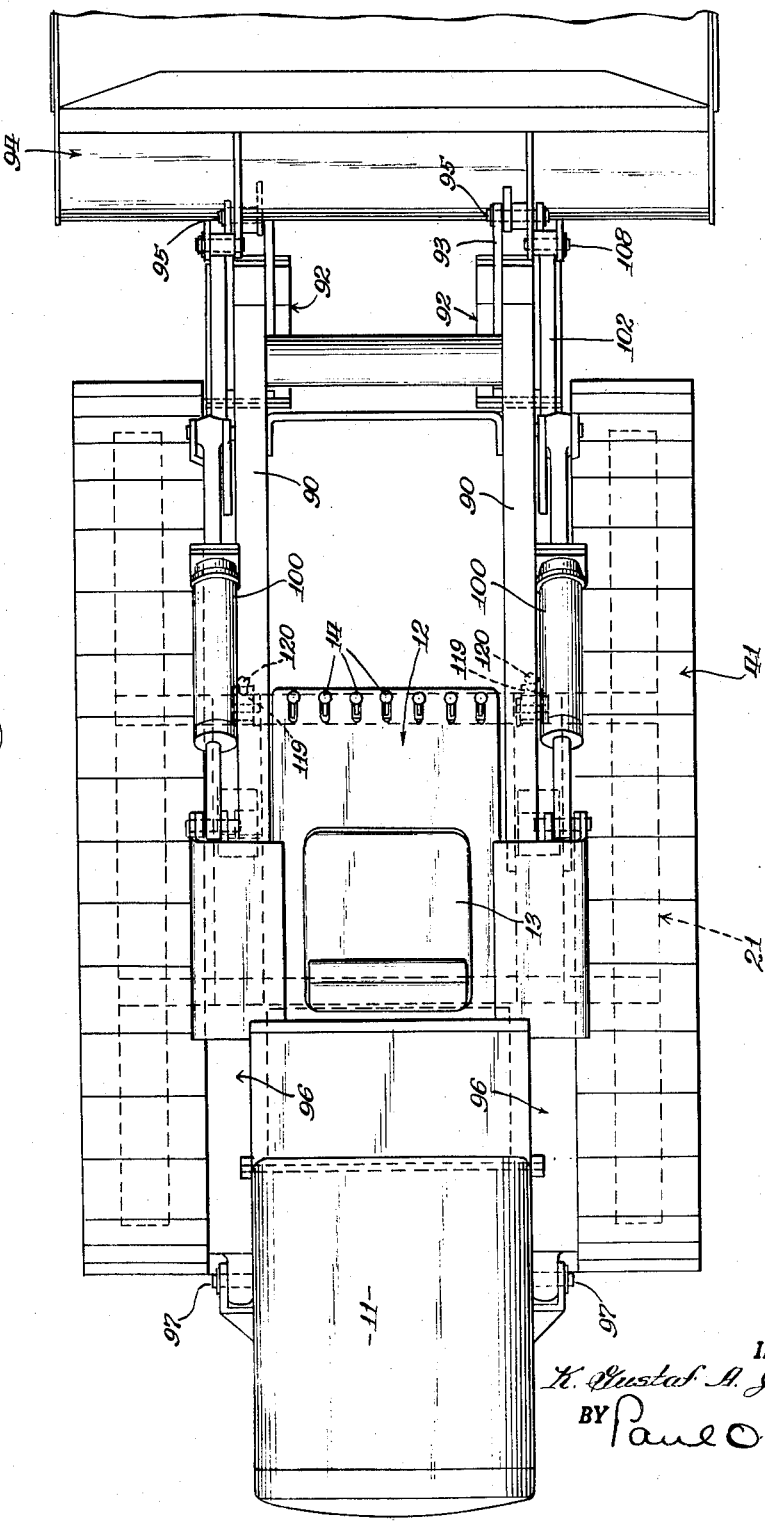

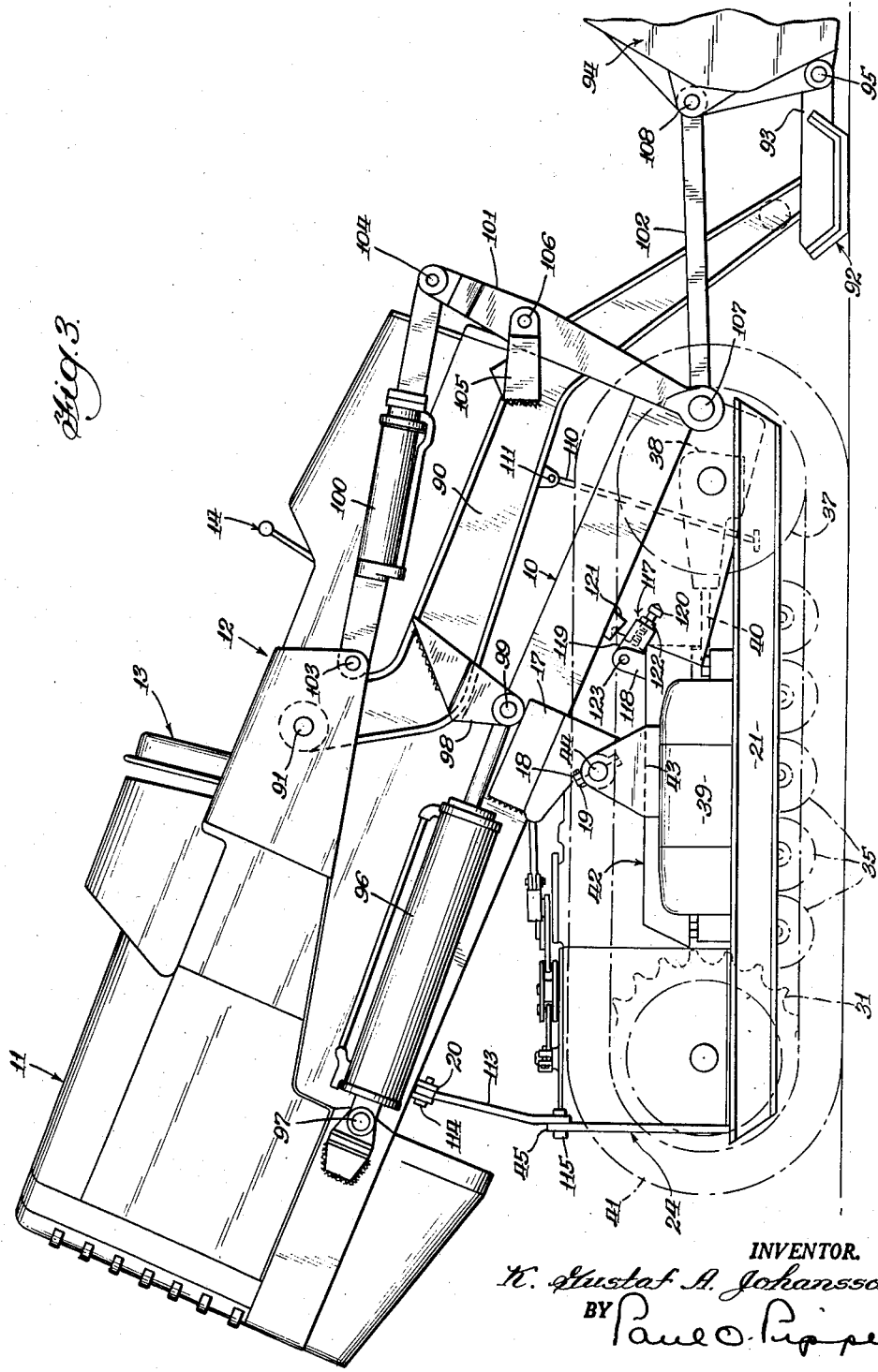

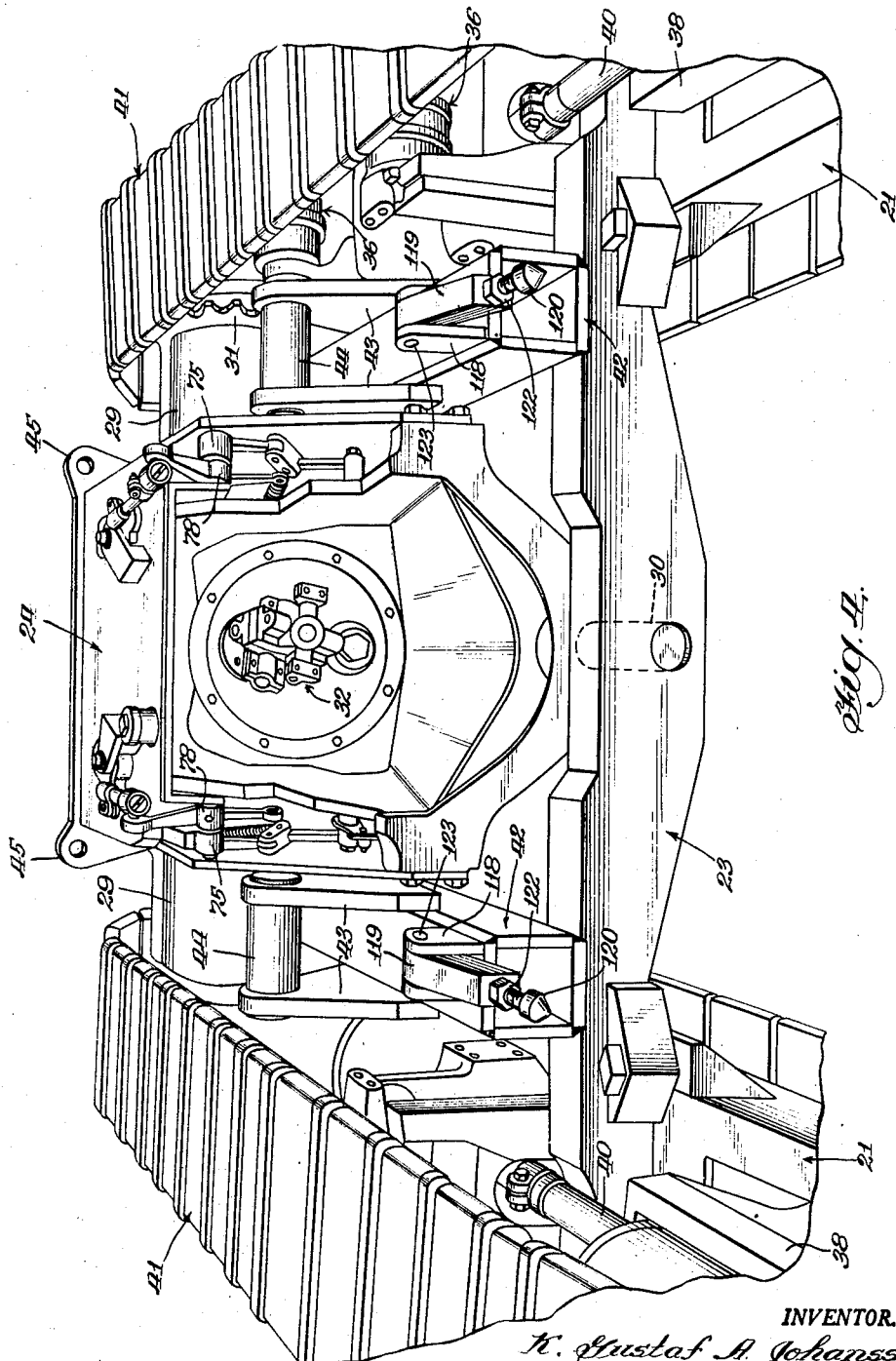

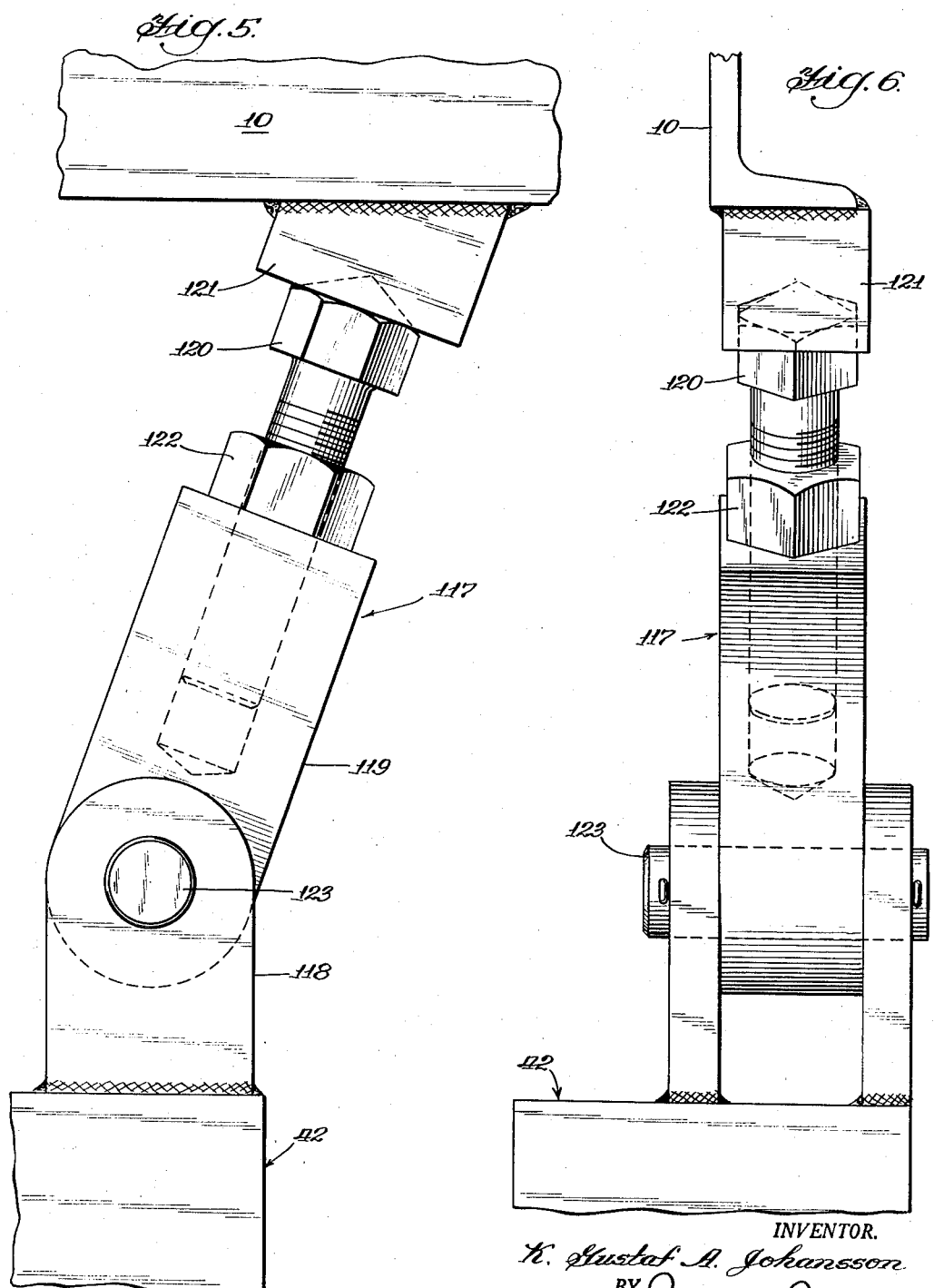

2,897,987
TRACTOR LOADERS

K. Gustaf A. Johansson, Wilmette, Ill., assignor to The Frank G. Hough Co., a corporation of Illinois Application December 3, 1956, Serial No. 625,809

3 Claims. (Cl. 214—140)

This invention relates to tractor loaders, and more specifically to an improved arrangement of the tractor loader shown and described in the copending patent application of Ralph L. Beyerstedt et al., Serial No. 513,246, filed June 6, 1955, now Patent No. 2,846,096, and entitled "Tractor Loaders."

The noted patent application discloses a tractor loader of the type having a bucket or earth-working tool extending forwardly of the tractor. The tractor is of the crawler type and comprises a pair of crawler tracks having a final drive housing mounted therebetween at the rear end thereof. The body of the tractor carries a rearwardly disposed engine, and a forwardly disposed operator's compartment. The earth-working tool is carried by the body. Substantially the entire weight of the body of the tractor and the tool is carried on one transverse axis on the track frames and substantially at the longitudinal center thereof. The body and earth-working tool are in substantial balance. This arrangement permits easy servicing of the elements within the final drive housing by pivoting the rearward end of the tractor body upwardly and away from the final drive housing. To keep the body in substantial longitudinal parallel alignment with the crawler tracks, the rearward end of the body and the upper rear portion of the final drive housing are provided with pin and clevis means.

It has been found in the operation of such a machine that relatively large shearing forces are produced in the pin and clevis means when the earth-working tool encounters substantial load conditions. These shearing forces are applied to the pin and clevis means through a lever arm extending from the bucket to the pin and clevis means with a fulcrum at the pivot axis of the body on the track frames. It is an object of this invention to provide means for such a tractor loader for reducing the shearing forces on the pin and clevis means.

It is another object of the present invention to provide removable means in a tractor loader of the described type which will cooperate with the clevis means at the rear portion of the body to form an efficiently balanced and supported machine for the various load conditions encountered by the earth-working tool.

It is another object of the present invention to provide removable means, in a loader of the described type, for partially supporting the body relative to the traction means, and which may be easily removed to permit pivoting of the body relative to the track frames for servicing of the final drive housing.

It is another object of the present invention to provide adjustable means, in a loader of the described type, which provides an adjustable support between the crawler tracks and the body forwardly of the transverse pivot axis of the body to the track frames for substantially rigidly supporting the body relative to the track frames irrespective of any looseness in the pin and the clevis means at the rear portion of the body.

It is another object of the present invention to provide a jack arrangement in a tractor loader of the described type which is easily adjustable and removable to efficiently align the body relative to the traction means and distribute the load of the body and the tool means on the traction means.

Other objects and features of the present invention will be apparent upon a perusal of the following specification and drawings of which:

Figure 1 is a side elevational view of one embodiment of a tractor loader constructed according to the present invention;

Figure 2 is a top plan view of the structure shown in Figure 1;

Figure 3 is a side elevational view of the structure shown in Figure 1 with the body of the tractor tilted to one position;

Figure 4 is a partial perspective view of the traction means with the body of the tractor removed and looking from the forward end of the traction means;

Figure 5 is an enlarged side elevational view of the supporting means or jack of the present invention, and Figure 6 is a side view of the structure shown in Figure 5.

The present embodiment is the preferred embodiment but it is to be understood that changes can be made in the present embodiment by one skilled in the art without departing from the spirit and scope of this invention.

Referring to the drawings, the tractor loader of the subject invention may be said to generally comprise three components, namely, the body of the tractor, the traction means of the tractor and the earth-working tool. The body of the tractor comprises a longitudinal chassis or frame member 10 to which the other members of the body are mounted. An engine compartment 11 having an engine disposed therein is mounted on the frame 10 substantially at the rear thereof. Forwardly of the engine compartment 11, is an operator's compartment 12 having a forwardly facing seat 13 mounted therein and the various necessary control elements such as levers 14. A pair of depending brackets 17 are mounted on the longitudinal sides of the frame 10 substantially at the center thereof. One-half of a bearing 18 is secured to each bracket 17. The bearings 18 are positioned along a common axis transversely of the body of the tractor with the axis lying substantially below and forwardly of the center of gravity of the body. When the earth-working tool is mounted to the body the center of gravity is changed to a position substantially directly above the bearings 18. Another half of a bearing 19 is provided for each of the bearings 18, and means are provided for securing the halves together to form a complete bearing on each side of the body of the tractor. The bearings 18 and 19 cooperate along a surface lying in a plane which is inclined upwardly and rearwardly of the body of the tractor when the body of the tractor is disposed substantially horizontally as shown in Figure 1. The bearings 18 and 19 provide the primary supporting means for the body of the tractor on the traction means.

The traction means of the present embodiment comprises a crawler track mechanism. The crawler track mechanism comprises a pair of spaced apart track frames 21 to which the other portions or elements of the traction means are mounted. The track frames 21 are interconnected by a pair of transverse support bars 22 and 23. A final drive housing 24 is also mounted to the track frames 21. The final drive housing 24 may be of any suitable type known in the art and comprises a cast or fabricated housing. The final drive housing 24 includes a pair of axially spaced members 29 extending from each side thereof at the rear thereof. The axially spaced members 29 are mounted to the track frames 21 substantially at the rear ends thereof to support the rear portions of the final drive housing 24 as may be seen in Figure 4. The forward end of the final drive housing 24 is supported by a pin 30 which is secured to the forward end of the final drive housing 24 and journalled through the front transverse support member 23. The axially spaced members 29 carry a shaft upon which the driving sprockets 31 are mounted. Power input to the final drive housing 24 is through a shaft to which the universal joint 32 is mounted, as may be seen in Figure 4. Power train means (not shown) are provided within the final drive housing 24 between the input to the final drive housing and the driving sprockets 31. Clutch and brake mechanisms (not shown) are also mounted within the final drive housing 24 in cooperation with the power train therein to provide selectively operable means to control the transmission of power to the driving sprockets 31. The lever 75 shown in Figure 4 and the linkages and shafts connected thereto, in cooperation with means (not shown) carried by the body of the tractor provide for operation of the brakes within the final drive housing by the operator. The levers 78 shown in Figure 4 and the various linkages and shafts connected thereto in cooperation with means (not shown) carried within the body of the tractor, provide for operation of the clutches within the final drive housing 24 by the operator. The various described elements which are within the final drive housing 24 may be easily serviced therein when the top of the final drive housing 24 is removed therefrom.

Each of the track frames 21 are further provided with a plurality of upper track rollers 36 which are rotatively mounted thereto as can be seen in Figure 4. A pair of front idler wheels 37 are rotatively mounted in a pair of members 38 which are turned slidably mounted on the track frames 21. The members 38 are connected to a pair of track tensioning assemblies 39 through a pair of rods 40. A pair of continuous tracks 41 of any type well known in the art are mounted about the sprocket wheels 31, the plurality of lower rollers 35, upper rollers 36, and the front idler wheels 37.

A pair of beams or box channel members 42 are provided for supporting the body of the tractor. The beams 42 are positioned across the top of the transverse support members 22 and 23 substantially adjacent to the track frames 21 as can be seen in Figure 4. A pair of substantially triangularly shaped flanges 43 are secured in a spaced-apart relationship to each of the beams 42. The upper end of each pair of flanges 43 is provided with a stub shaft 44 secured therebetween. The stub shafts 44, the pairs of flanges 43, and the beams 42 are formed of a size having sufficient strength to support the weight of the body of the tractor and the load of the earth-working tool, and these elements are so positioned that the stub shaft 44 lies substantially midway between the axes of the sprocket 31 and the front idler wheels 37 and substantially adjacent the upper section of the tracks 41. The stub shafts 44 are further formed to have a diameter substantially equal to the diameter of the bearings formed by the bearing members 18 and 19 previously described.

The body of the tractor is mounted on the traction means by positioning the body so that the bearing elements 18 cooperate with the stub shafts 44, permitting the bearing elements 19 to be positioned about the lower portion of the stub shafts 44 and fastened to the bearing elements 18. When the body of the tractor is mounted in this manner to the traction means, the body is tiltable or pivotable about the axis through the stub shafts 44. The body of the tractor is limited from any substantial pivotal movement relative to the traction means in a counterclockwise direction as viewed in Figure 1 by the final housing 24. However, the body of the tractor is pivotable a substantial amount in a clockwise direction as viewed in Figure 1, wherein the forward portion of the body will move downwardly between the track frames 21 as can be seen in Figure 3.

The back wall of the final drive housing 24 is formed to have a pair of flanges 45 thereon at the upper side edges thereof as may be seen in Figure 4, and the flanges 45 are provided with openings therethrough. The portions of the body of the tractor directly above the flanges 45 when the body is in a substantially horizontal position, are provided with pairs of clevises 20. When the body of the tractor is in a substantially horizontal position pins 46 can be mounted through the clevises 20 and the flanges 45 to position the body of the tractor in a substantially parallel position relative to the track frames 21.

To further secure the body of the tractor against any movement relative to the track frames 21 and to aid in positioning the body of the tractor in proper alignment with the traction means, an assembly or jack 117 is provided for each side of the tractor. Each assembly 117 comprises a pair of flanges 118 secured to and upstanding from the forward end of one of the members 42, a tapped member 119, a screw 120, a bearing block 121 and a locknut 122. The tapped member 119 which is provided with a tapped hole longitudinally therein extending from one end thereof is pivotally mounted at the other end thereof between flanges 118 by means of a pin 123. The screw 120 is threaded within the tapped opening of the member 119. The head of the screw 120 is cone-shaped as may easily be seen in Figures 5 and 6. The head of the screw 120 below the cone-shaped portion is formed so that a wrench may be applied thereto to turn the screw 120. The block 121 is mounted, as by welding, to the underside of the frame 10 of the tractor body at a position vertically above and forwardly of the flanges 118 when the body of the tractor is in a substantially horizontal position. The underside of the block 121 is provided with a cone-shaped depression therein of the same shape as the cone-shaped portion of the screw 120 to serve as a seat for the screw 120. The cone-shaped depression of the block 121 is positioned therein so as to be substantially normal to an axis extending through the block 121 and the pin 123. Thus it may be seen that if a wrench is applied to the screw 120, the cone-shaped portion of the screw 120 may be projected within the cone-shaped depression of the block 121 or removed therefrom. The locknut 122 is threaded onto the screw 120, and is used to secure the screw 120 in any selected position of extension or retraction from the member 119.

Turning next to a detailed description of the earth-working tool arrangement of the present invention and the cooperation of the tool arrangement with the previously described tractor, a boom 90 is provided in duplicate portions disposed on each side of the body of the tractor. One end of the boom 90 is pivotally mounted to the body of the tractor by means of pivotal mounting means 91. The boom 90 is positioned to extend forwardly of the tractor and the forward end of the boom 90 is provided with a pair of skid shoes 92 and extending links 93. A bucket 94, of any well-know type in the art, is pivotally mounted to the extending links 93 through pivotal mounting means 95. To raise and lower the boom 90 a pair of hydraulic rams 96 are provided. Each of the hydraulic rams 96 is pivoted at the head end thereof to one side of the frame 10 through pivotal mounting means 97. The rod end of each of the hydraulic rams 96 is pivotally mounted to one portion of the boom 90 intermediate the ends thereof through a bracket 98 and pivotal mounting means 99. To control the position of the bucket 94 relative to the boom 90, a linkage arrangement comprising a pair of hydraulic rams 100, a pair of levers 101, and a pair of links 102 is provided. Each of the hydraulic rams 100 is pivotally mounted at the head end thereof to one side of the body of the tractor through pivotal mounting means 103. The rod end of each of the hydraulic rams 100 is pivotally mounted to one end of one of the levers 101 by pivotal mounting means 104. Each of the levers 101 is pivotally mounted intermediate the ends thereof to one portion of the boom 90 intermediate the ends thereof through a bracket 105 and pivotal mounting means 106. The other end of each lever 101 and one end of one of the links 102 is pivotally interconnected by means of pivotal mounting means 107. The other end of each link 102 is pivotally mounted to the back of the bucket 94 through pivotal mounting means 108. Hydraulic fluid conduits, pumps, and valves (not shown) are provided for operation of the hydraulic rams 96 and 100.

In operation, the hydraulic rams 96 are operated to properly position the bucket 94 in a vertical direction for digging and the tractor is then moved to cause the bucket 94 to dig into any material being worked. The hydraulic rams 100 are operable to control the digging angle of the bucket 94, the pivotal position of the bucket relative to the boom 90, and when substantially extended cause the bucket 94 to be pivoted to a carrying position. To dump the bucket 94, the hydraulic rams 100 are substantially retracted.

As noted previously, when the earth-working tool is carried by the body of the tractor a substantially balanced unit is achieved, wherein the center of gravity of the body and the tool is located substantially vertically above the axis of the stub shafts 44. When the loader is operated to dig and carry the various loads required of such a machine, it has been found that substantial forces are applied to the body of the tractor. In the present arrangement these forces tend to cause the body of the tractor to be pivoted about the stub shafts 44. To secure the body of the tractor in substantially parallel alignment to the track frames 21, the body is positioned parallel to the track frames 21, and the pins 46 are inserted through the clevises 20 and the flanges 45. The member 119 is then pivoted upwardly, and the screw 120 is threaded outwardly from the member 119 until the cone-shaped portion of the screw 120 is securely seated in the cone-shaped depression of the blocks 121. The locknut 122 is then tightened to secure the screw 120 against any accidental withdrawal or movement away from the blocks 121. The longitudinal axis through each of the members 119 and screws 120 of the assemblies 117 will then be disposed in a forwardly and upwardly inclined direction relative to the tractor, as can be seen in the drawings. Proper adjustment of the screws 120 will compensate for any looseness that may exist between the pins 46, the clevises 20 and the flanges 45. It has been found that with this arrangement the substantial loads which are imposed on the bucket 94, and which generally act in a downward direction, will be substantially reduced in effect, upon the stub shafts 44 in a generally downward direction, and on the pins 46, clevises 20 and flanges 45 in generally upward direction, by a substantial absorption of these loads from the frame 10 of the body through the assemblies 117 to the box channel members 42.

To pivot the forward end of the body downward, as in exposing the upper surface of the final drive housing 24 for service, it is necessary first to release the locknuts 122, then threading the screws 120 into the members 119 until the cone-shaped portion of the screws 120 is out of engagement with the cone-shaped portion of the blocks 121, and then permitting the member 119 to be pivoted downward to a position such as shown in Figure 3. The pins 46 are then removed from engagement with the clevises 20 and the flanges 45.

The body of the tractor is then freed for pivotal movement of the forward end downward between the tracks. This pivotal movement is easily accomplished by holding the bucket 94 relative to the ground. One way of accomplishing this is to cause the bucket to engage some stationary object. Another way of holding the bucket relative to the ground is accomplished by using the link 110 which is pivotally mounted to one portion of the boom through pivotal mounting means 111 and to the track frame 21 through pivotal mounting means 112. When the bucket is secured relative to the ground, the hydraulic rams 96 may be extended, and since the hydraulic rams 96 may not lift the boom 90, the reaction of the head ends of the hydraulic cylinders 96 acting through the pivotal mounting means 97 to the frame 10 will cause the rearward portion of the body to be pivoted upwardly while the forward end of the body is pivoted downwardly between the crawler tracks. A link 113 is then mounted at one end thereof to the clevis 20 by means of a pin 114, and at the other end thereof to the flange 45 on the right side of the tractor by means of a pin 115 to secure the body of the tractor against any accidental lowering of the rearward portion of the body through a retraction of the rams 96. The upper surface of the final drive housing 24 is then exposed for servicing thereof.

To restore the loader to its normal operating position, the link 113 is removed, the hydraulic rams 96 contracted to permit the frame 10 to be substantially parallelly aligned with the track frames 21, at which time the pins 46 are again inserted through the clevises 20 and the flanges 45. The members 119 of the assemblies 117 are then manually pivoted upward along an axis through the blocks 131 and the pins 123, and the screws 120 are then threaded outwardly from the members 119 and toward the blocks 121 until the cone-shaped surface of each of the screws 120 is projected securely within the cone-shaped depression in each of the blocks 121. The locknuts 122 are then tightened, and with the removal of the link 110, the loader is in a condition for normal operation.

Having described the invention, what is considered new and desired to be protected by Letters Patent is:

1. In combination, a tractor traction means, a tractor body, a forwardly extending tool means carried by said body and operable to apply loads to said body tending to move the forward end of said body downwardly, pivot means mounting said body on said tractor traction means for pivoting about a transverse axis positioned intermediate the ends of said tractor traction means and said body at a point providing a substantially balanced unit of said body and said tool means, removable means for securing the rearward end of said body and the rearward end of said traction means against any pivotal movement therebetween, an extensible and retractable member pivotally mounted on said tractor traction means forwardly of said pivot means, the outer end of said retractable member being formed to have a cone-shaped surface, and a block carried by the underside of said body forwardly of the pivot axis of said extensible and retractable member to said tractor traction means, said block being formed to have a cone-shaped depression therein engageable with said cone-shaped surface of said member for further securing said body against any pivotal movement relative to said tractor traction means and for distributing part of any load of said tool means to said tractor traction means through said member when said cone-shaped surface of said member is mounted within said cone-shaped depression of said block.

2. In a tractor loader having a body carrying a forwardly extending earth-working tool, and having said body pivotably mounted intermediate the ends thereof on the track frames of a crawler track mechanism intermediate the ends thereof, removable means for parallelly aligning said body relative to said traction means comprising an extensible and retractable member pivotally carried by said traction means forwardly of the pivot axis of said body to said traction means, and a block carried on the underside of said body and formed to receive the outer end of said member therewithin for maintaining said body parallelly aligned relative to said crawler track mechanism.

3. In a tractor loader having a body carrying a forwardly extending earth-working tool, and having said body pivotally mounted intermediate the ends thereof on the track frames of a crawler track mechanism intermediate the ends thereof, removable means for parallelly aligning said body relative to said traction member comprising a tapped member pivotally mounted at one end thereof on said track frames, a screw threaded partially within said tapped member, the head of said screw being formed as a cone-shaped surface, and a block mounted on the underside of said body and formed to have a cooperating cone-shaped depression therein ror receiving said cone-shaped head of said screw for maintaining said body parallelly aligned relative to said crawler track mechanism.

References Cited in the file of this patent

UNITED STATES PATENTS

| | | |
|---|---|---|
| 1,704,505 | Kampman | Mar. 5, 1929 |
| 2,376,181 | Petersen et al. | May 15, 1945 |
| 2,711,256 | Cutler | June 21, 1955 |
| 2,778,131 | Herr | Jan. 22, 1957 |
| 2,846,096 | Beyerstedt | Aug. 5, 1958 |